(12) United States Patent
Petzold et al.

(10) Patent No.: US 8,090,513 B2
(45) Date of Patent: Jan. 3, 2012

(54) METHOD FOR CONTROLLING AN AUTOMATED FRICTION CLUTCH

(75) Inventors: Rainer Petzold, Friedrichshafen (DE);
Peter Herter, Ravensburg (DE); Franz Bitzer, Friedrichshafen (DE); Roland Mair, Tettnang-Laimnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 463 days.

(21) Appl. No.: 12/435,800

(22) Filed: May 5, 2009

(65) Prior Publication Data

US 2009/0281700 A1 Nov. 12, 2009

(30) Foreign Application Priority Data

May 9, 2008 (DE) .................. 10 2008 001 682

(51) Int. Cl.
*G06F 17/00* (2006.01)
(52) U.S. Cl. .......................... 701/68; 701/67
(58) Field of Classification Search .............. 701/68, 701/67; 477/174, 175; 73/1.79, 1.81
See application file for complete search history.

(56) References Cited

U.S. PATENT DOCUMENTS

| 7,474,950 | B2 | | 1/2009 | Schwenger et al. | |
| 8,000,869 | B2 | * | 8/2011 | Petzold et al. ................. | 701/68 |
| 2005/0051408 | A1 | * | 3/2005 | Schwenger et al. ....... | 192/109 F |
| 2008/0242507 | A1 | | 10/2008 | Herter et al. | |
| 2009/0223772 | A1 | * | 9/2009 | Burkhart et al. ......... | 192/70.252 |
| 2009/0258757 | A1 | * | 10/2009 | Man et al. ..................... | 477/166 |
| 2010/0048351 | A1 | * | 2/2010 | Sayman .......................... | 477/80 |
| 2010/0108461 | A1 | * | 5/2010 | Bitzer ......................... | 192/30 W |
| 2010/0113218 | A1 | * | 5/2010 | Herter et al. .................... | 477/83 |
| 2011/0125378 | A1 | * | 5/2011 | Blessing et al. ................ | 701/68 |

FOREIGN PATENT DOCUMENTS

| DE | 19953032 | | 5/2000 |
| DE | 101 63 438 | A1 | 7/2003 |
| DE | 10 2005 039 922 | A1 | 3/2007 |

\* cited by examiner

*Primary Examiner* — Jeremy R Severson
(74) *Attorney, Agent, or Firm* — Davis & Bujold P.L.L.C.

(57) ABSTRACT

A method of controlling an automated friction clutch in a drivetrain of a motor vehicle between a drive motor and a manual transmission. During clutch actuation, at least one operating parameter of the friction clutch is detected by a sensor and from variation of the operating parameter at least one adaptation parameter is derived for correcting a control parameter of the associated clutch control element. To obtain information about variation of the clutch release force and to improve the control of an associated clutch control element, the friction clutch is fully disengaged with constant control or actuation of the clutch control element. During the disengagement process, the release travel path is determined as a function of release time, and from the time variation of the release travel path, a characteristic value is determined which is used to determine an adaptation parameter for correcting the control parameter of the clutch control element.

9 Claims, 3 Drawing Sheets

METHOD FOR CONTROLLING AN AUTOMATED FRICTION CLUTCH

This application claims priority from German patent application serial no. 10 2008 001 628.9 filed May 9, 2008.

FIELD OF THE INVENTION

The invention concerns a method for controlling an automated friction clutch which is made as a diaphragm spring clutch and is arranged as a starting and shifting clutch in a drivetrain of a motor vehicle between a drive motor and a manual transmission, in such manner that during clutch actuation at least one operating parameter of the friction clutch is detected by sensor means, and from the variation of this operating parameter at least one adaptation parameter is derived for the correction of a control parameter of the associated clutch control element.

BACKGROUND OF THE INVENTION

Diaphragm spring clutches have been known for a long time and, owing to their robust and space-saving structure, have become well established particularly in motor vehicles as the preferred design for passively engaging, dry-operating clutches. In a diaphragm spring clutch, the contact pressure spring is made as a diaphragm spring, by means of which a pressure plate is pressed axially against a counterpressure plate which is connected in a rotationally fixed manner to the driveshaft of the drive motor and is usually made as a flywheel, whereby at least one driving disk provided with friction linings and connected rotationally fixed to the input shaft of the change-speed transmission, is gripped so that torque from the drive motor can be transmitted to the manual transmission by the action of the friction force. The diaphragm spring is usually designed such that over the entire life of the clutch it ensures reliable torque transmission.

To engage and disengage a diaphragm spring clutch, the diaphragm spring has inner spring blades on which a clutch control element, made as a central release device or a release lever that can be pivoted by an externally arranged clutch control element, can exert an axial release force via a release bearing. As regards the structure of the diaphragm spring clutch, in particular the support of the diaphragm spring, a distinction can be made between an extended clutch, in which the releasing force acts in the direction of the transmission, and a compressed clutch, in which the releasing force acts toward the drive motor.

In the diagram of FIG. 4 the upper curve shows the contact pressure force $F_{K\_Anpr}$ and the lower curve shows the releasing force $F_{K\_Ausr}$ of a diaphragm spring, in each case plotted against the release travel path $x_K$ for the engaged condition of the clutch. On the upper curve the point $P_B$ indicates the operating point of the clutch for fresh friction linings of the associated driving disk and the point $P_B'$ the operating point for worn friction linings. Consequently, in the case of a diaphragm spring clutch with automatic zero-point compensation the working range, i.e. the range between the "closed" path point $x_{K0}$ for the fully engaged condition and the "open" path point $x_{K1}$ for the fully disengaged condition, becomes displaced during the course of friction lining wear from right to left, i.e. in the representation of FIG. 4 from the range $x_{K0}$ to $x_{K1}$ to the range $x_{K0}'$ to $x_{K1}'$. The corresponding variations of the releasing force against release travel path during a clutch release process are shown in simplified form in FIG. 4, respectively as broken lines $F_{KA}$ and $F_{KA}'$ under the curve for the releasing force $F_{K\_Ausr}$.

A detailed representation of a typical variation of the releasing force $F_{KA}$ against release travel path $x_K$ during a disengagement process of a diaphragm spring clutch is reproduced qualitatively in FIG. 5. According to this the variation of the releasing force, $F_{KA}$ is divided into an initial, rising range A in which the releasing force $F_{KA}$ increases almost linearly as a function of release travel path $x_K$, followed by a transition range B with a progressively slowing increase of the releasing force $F_{KA}$ to a value which, in a subsequent saturation range C, remains essentially constant and in the range of the maximum releasing force $F_{KA\_max}$ that can be reached there during normal service operation. In the next range D the releasing force $F_{KA}$ at first decreases with increasing release travel path $x_K$, and then increases again.

In view of the non-linear variation of the releasing force $F_{KA}(x_K)$ and of production-tolerance-related deviations and wear-related changes of the variation, there is a need for a corresponding adaptation of control parameters of the associated clutch control element in order to ensure reproducibility of automatically controlled disengagement and engagement processes. Among other things this is also made clear by the fact that in DE 10 2005 039 922 A1 a control element of a diaphragm spring clutch is proposed, such that the characteristic regulation curve of an associated regulator is designed so that the non-linear variation of the releasing force $F_{KA}(x_K)$ is compensated by appropriate actuation of the clutch control element. However no possible method for adapting the characteristic regulation curve, i.e. for adapting the characteristic regulation curve to the respective releasing force variation $F_{KA}(x_K)$ of the diaphragm spring clutch at the time, is described in DE 10 2005 039 922 A1.

Known adaptation methods for automated friction clutches have hitherto been limited to the determination of inflection points on the respective torque characteristic representing the torque that can be transmitted by the friction clutch as a function of the regulating path. Thus for example, various methods are known for determining or adapting the "closed" point or engaged point on the torque characteristic, in which that value of the regulating path is determined, at which the friction clutch is completely engaged and a maximum torque predetermined by design can be transmitted.

In other known methods the active point of a friction clutch, also known as its touch or contact point, is determined or adapted, this being the point at which the frictional elements concerned just come into contact with or separate from one another so that the friction clutch can transit an infinitesimally small torque. Such methods are based on sensor-detectable reactions of operating parameters of associated or nearby components, such as the regulation path of the clutch control element, the speed of the transmission input shaft or the drive motor, or the fuel injection quantity of the drive motor.

In contrast, in DE 101 63 438 A1 a method is described, in which during an automated clutch actuation of a diaphragm spring clutch an operating parameter is detected by sensor means, and from the variation of this operating parameter an adaptation parameter is derived for correcting a control parameter of the associated clutch control element. According to this, it is provided that during a disengagement or engagement process of the friction clutch the releasing force $F_{KA}$ is determined by sensor means as a function of the release travel path $x_K$, and from the variation of the releasing force $K_{KA}(x_K)$, specifically with reference to a discontinuity in the gradient variation of the releasing force $F_{KA}(x_K)$, the contact point of the diaphragm spring clutch is determined. The disadvantage of this procedure, however, is that besides a path sensor an additional force sensor is needed, and the discontinuity in question in the gradient variation of the releasing force $F_{KA}(x_K)$ only occurs in significant form when the driving disk has a rigid lining with no spring. In any case, in this method the variation of the releasing force $F_{KA}(x_K)$ is not evaluated for its own sake, but is only used for determining the contact point which, however, is only one inflection point of the torque characteristic.

SUMMARY OF THE INVENTION

Against this background the purpose of the present invention is to indicate a method by means of which, without great effort, complexity and expense, additional information about the variation of the releasing force $F_{KA}(x_K)$ can be determined and used to improve the control of an associated clutch control element.

The invention therefore starts from a method for controlling an automated friction clutch made as a diaphragm spring clutch and arranged as both a starting and a shifting clutch in a drivetrain of a motor vehicle between a drive motor and a manual transmission, such that during a clutch actuation at least one operating parameter of the friction clutch is detected by sensor means and, from the variation of the operating parameter, at least one adaptation parameter is derived for the correction of a control parameter of the associated clutch control element.

To achieve the stated objective, it is in this case provided that the friction clutch is fully disengaged with constant control or actuation of the clutch control element, during the disengagement process the release travel path is determined as a function of the release time, and from the time variation of the release travel path at least one characteristic value is determined, from which at least one adaptation parameter is determined for the correction of a control parameter of the clutch control element.

The invention is based on the recognition that during a disengagement process of a diaphragm spring clutch with constant control or actuation of the clutch control element, i.e. with constant increase of the regulating force, a typical time variation of the release travel path $x_K(t)$ is obtained, which is directly correlated with the characteristic releasing force curve, i.e. the travel path variation of the releasing force $F_{KA}(x_K)$. Owing to the constant regulation force gradient of the clutch control element, because of the linear increase of the releasing force $F_{KA}(x_K)$ on the spring (see range A in FIG. 5) a relatively small linear increase of the release travel path $x_K(t)$ is at first obtained in the time variation of the release path $x_K(t)$. The progressive slowing of the increase of the releasing force $F_{KA}(x_K)$ on the spring in the transition range (see range B in FIG. 5) then results, in the time variation of the release travel path $x_K(t)$, in a progressive increase of the release travel path $x_K(t)$, i.e. an increase in the disengagement rate $v_K=dx_K/dt$. On reaching the saturation range in the path variation of the releasing force $F_{KA}(x_K)$ with a substantially constant releasing force $F_{KA}(x_K)$ (see range C in FIG. 5), the time variation of the release travel path $x_K(t)$ changes to a substantially linear and steeper increase of the release travel path $x_K(t)$ because of the still present constant regulation force increase. Thus, at least qualitatively, the time variation of the release travel path $x_K(t)$ is an inverse image of the path variation of the releasing force $F_{KA}(x_K)$.

In the present method this relationship is used in order, from the time variation of the release travel path $x_K(t)$ determined during a constantly controlled disengagement process, to determine at least one characteristic value from which at least one adaptation parameter is then determined for the correction of a control parameter of the clutch control element. Thus, the adaptation parameter is implicitly also a function of the travel path variation of the releasing force $F_{KA}(x_K)$, which is determined by the condition of the diaphragm spring clutch at the time, in particular by a production-related series variation, and on the wear condition of the friction linings.

The constant control or actuation of the clutch control element is produced, if it is designed as a pressure-medium-actuated control cylinder, by a constant throttle cross-section of an associated proportional valve or by a constant frequency of an associated frequency-modulated pulse valve, and if it is of electro-mechanical design, by a constant current or voltage gradient of the associated electric motor. The method according to the invention only presupposes the presence of a regulation path sensor and a timer which, however, are in any case present in an automated clutch control. Consequently no additional sensor is needed for the implementation of the method. Accordingly, the method can be integrated into any control device of an automated diaphragm spring clutch without much effort or cost.

A first version of the method according to the invention provides that from the release travel path variation $x_K(t)$ a characteristic release travel point $(x_S, x_T)$ is determined as a characteristic value for the non-linear transition from the linear increase range at the beginning of the release travel path $x_K(t)$ to the substantially linear increase range at the end of the release travel path $x_K(t)$, that from the release travel point $(x_S, x_T)$ an end point $x_{LE\_neu}$ of the linear increase range at the beginning of the release travel path $x_K(t)$ or an end-point difference $\Delta x_{LE}=x_{LE\_alt}-x_{LE\_neu}$ of the end point $x_{LE\_neu}$ with respect to a previously valid end point $x_{LE\_alt}$ is derived, and that the previously valid end point $x_{LE\_alt}$ then corrected using the new end point $x_{LE\_neu}$ or the end-point difference $\Delta x_{LE}$.

In a manner known per se, the end point $x_{LE}$ can be corrected either by replacing the previously valid end point $x_{LE\_alt}$ with the new end point $x_{LE\_neu}$, or by changing it in the direction of the new end point $x_{LE\_neu}$. When the diaphragm spring clutch is completely or partially disengaged, knowledge of the end point $x_{LE}$ of the linear increase range at the beginning of the release travel path $x_K(t)$ can be used to apply constant control of the clutch control element as a function of the time until the end point $x_{LE}$ has been reached, and from the end point $x_{LE}$ onward, to control any further disengagement in a path-dependent manner. This in each case results in simplification and acceleration of control of the disengagement process.

At the end of or after the disengagement process the characteristic release travel path point $x_S$ can be determined as the intersection point between a tangent to the linear increase range at the beginning of the release travel path $x_K(t)$ and a tangent to the substantially linear increase range at the end of the release travel path $x_K(t)$. It is also possible, however, to determine the characteristic release travel path point $x_T$ during the disengagement process, as the value of the release travel path $x_K(t)$ at which the disengagement rate $v_K=dx_K/dt$ reaches or exceeds a specified rate limit value $v_{K\_Gr}$ ($v_K \geq v_{K\_Gr}$).

Expediently, the end point $x_{LE}$ of the linear increase range or the end-point difference $\Delta x_{LE}=x_{LE\_alt}-x_{LE\_neu}$ is determined from the respective release travel path point $x_S$ or $x_T$ by means of a clutch-specific data set that contains a corresponding correction value $\Delta x_{Korr}$. The data set can be determined empirically by the clutch or vehicle manufacturer and stored in the data memory of the clutch control unit.

To largely exclude the influence of rate-dependent forces on the determination of the end point $x_{LE}$, it is advantageous to carry out the disengagement of the friction clutch with constant control or actuation of the clutch control element which, in the linear increase range at the beginning of the release travel path $x_K(t)$, corresponds to a minimum disengagement rate $v_{K\_min}$ lower than a nominal disengagement rate $v_{K\_soll}$ used in normal operation ($v_K \approx v_{K\_min}$ or $v_K < v_{K\_soll}$).

For a further evaluation of the release travel path variation $x_K(t)$, it can also be appropriate for disengagement of the friction clutch to be carried out with constant control or actuation of the clutch element which, in the linear increase range at the beginning of the release travel path $x_K(t)$, corresponds to the nominal disengagement rate ($v_K \approx v_{K\_soll}$) used in normal operation. This in particular makes it possible, in a second version of the method according to the invention, to determine from the time variation of the release travel path $x_K(t)$, the disengagement rate $v_{K\_ist} = \Delta x_K / \Delta t$ of the linear increase range at the beginning of the release travel path $x_K(t)$, then forming the rate difference $v_K$ relative to the nominal disengagement rate $v_{K\_soll}$ ($\Delta v_K = v_{K\_soll} - v_{K\_ist}$), and then correcting the control parameter of the clutch control element concerned, in proportion to the rate difference $\Delta v_K$, in order to arrive at the nominal disengagement rate $v_{K\_soll}$.

To compensate for production-tolerance-related variation of the releasing force variation $F_{KA}(x_K)$ of a series of diaphragm spring clutches, the correction of a control parameter of the clutch control element in accordance with the invention is carried out for the first time by the manufacturer on completion of the final assembly of the motor vehicle concerned. During the subsequent use of the motor vehicle concerned, the correction of a control parameter of the clutch control element in accordance with the invention is preferably carried out each time the motor vehicle is re-started.

To increase the accuracy of the clutch control it can also be expedient to carry out the correction of a control parameter of the clutch control element in accordance with the invention also during the driving operation of the motor vehicle at regular time intervals, in each case during a driving pause in connection with a driving-operation-independent actuation of the clutch and/or, during driving, in connection with a starting- or gearshift-related actuation of the clutch.

BRIEF DESCRIPTION OF THE DRAWINGS

To clarify the invention the description of a drawing with example embodiments is attached. The drawings show.

DETAILED DESCRIPTION OF THE PREFERRED EMBODIMENTS

Figure 1:
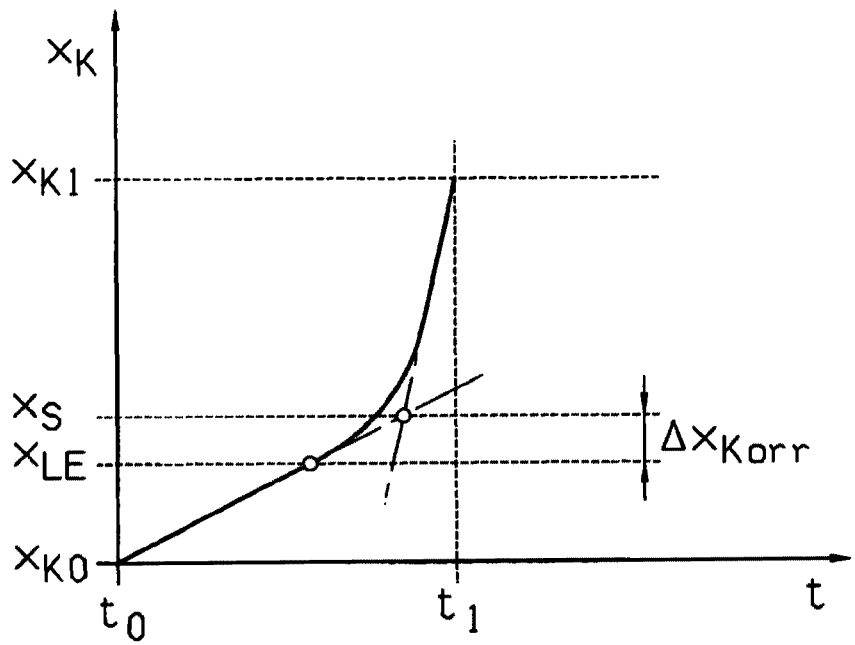
FIG. 1: Diagram illustrating a first method for determining the characteristic of a diaphragm spring clutch from the time variation of the release travel path

The continuous line in the diagram of FIG. 1 represents the time variation of the release travel path $x_K(t)$ for a diaphragm spring clutch during its actuation, produced during a continuous control or actuation of the clutch control element, i.e. during constant increase of the releasing force. Thus, the time variation of the release travel path $x_K(t)$ from the beginning of the disengagement process at time $t_0$ until the end of the disengagement process at time $t_1$ consists of a small linear increase of the release travel path $x_K(t)$ at the beginning of the disengagement process, followed by a progressive rise of the release travel path $x_K(t)$, i.e. a clear increase of the disengagement rate $v_K = dx_K/dt$, and then a substantially linear and steeper increase of the release travel path $x_K(t)$ toward the end of the disengagement process.

Figure 5:
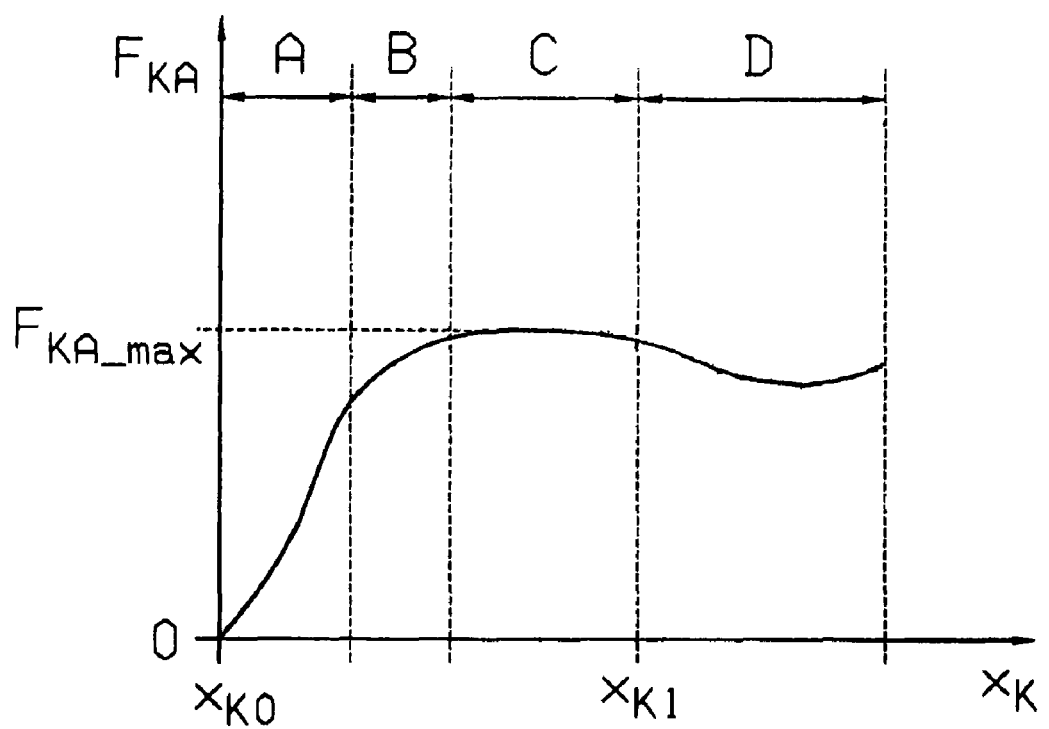
FIG. 5: General representation of the variation of the releasing force as a function of release travel path, for a diaphragm spring clutch during a disengagement process

The linear rise of the release travel path $x_K(t)$ of small inclination at the beginning of the disengagement process corresponds to the linear increase of the releasing force $F_{KA}$ along the path variation of the releasing force $F_{KA}(x_K)$, which is denoted as range A in the diagram of FIG. 5. Thus, the end point of the linear increase of the release travel path $x_K(t)$ at the beginning of the disengagement process, denoted in FIG. 1 as $x_{LE}$, is an important operating point which can be used for controlling the associated clutch control element. Since, because of natural fluctuations of the regulation path signal from an associated path sensor, this path point cannot be determined directly, that must be done indirectly.

For that purpose, in accordance with the depiction in FIG. 1 it is provided that as a replacement, a release travel path point $x_S$ characteristic of the end point $x_{LE}$ of the linear range is determined as the intersection between a tangent to the linear increase range at the beginning of the release travel path $x_K(t)$ and a tangent to the substantially linear increase range at the end of the release travel path $x_K(t)$. The tangents concerned are each represented FIG. 1 by a dot-dash line. Since the release path point $x_S$ so determined is above the actual end point $x_{LE}$, the end point $x_{LE}$ is determined by subtraction of a correction value $\Delta x_{Korr}$ in accordance with the equation $x_{LE} = x_S - \Delta x_{Korr}$.

The clutch-specific correction value $\Delta x_{Korr}$ can be determined from the path point $x_S$ determined, for example by means of a data set previously empirically determined by the clutch or vehicle manufacturer and stored in a data memory of the clutch control unit. The end point $x_{LE}$ of the linear range so determined can be used as a new valid end point, or for correcting a previously valid end point of the lower linear rise of the curve $x_K(t)$ of the release travel path as a function of time.

Figure 2:
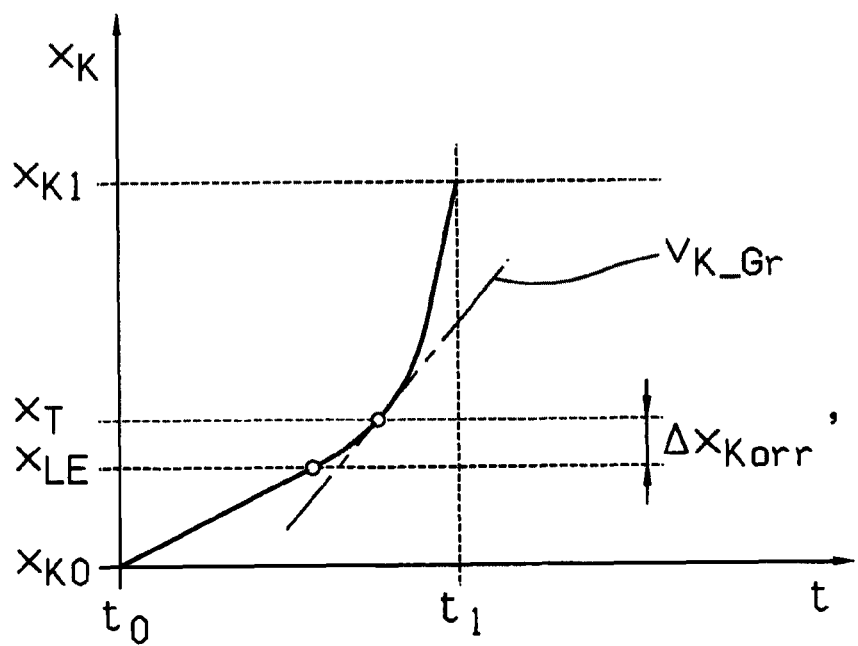
FIG. 2: Diagram illustrating a second method for determining substantially the same characteristic of a diaphragm spring clutch from the time variation of the release travel path

With exact knowledge of this end point $x_{LE}$ Of the linear increase range at the beginning of the release travel path $x_K(t)$, during complete or partial disengagement of the diaphragm spring clutch the clutch control element can be controlled or actuated constantly in a time-dependent manner until the end point $x_{LE}$ is reached, and when released farther, it can be regulated in a path-dependent manner from the end point onward. Compared with completely path-dependent regulation of a disengagement process, this simplifies and speeds up the control sequence. In a variant of the method illustrated in the diagram of FIG. 2, it is provided that instead of the actual end point $x_{LE}$ of the linear range of the time variation $x_K(t)$, first a release path point $x_T$ characteristic thereof is determined as the value of the release travel path $x_K(t)$ at which the disengagement rate $v_K = dx_K/dt$ reaches or exceeds a specified rate limit value $v_{K\_Gr}$ ($v_K \geq v_{K\_Gr}$). The rate limit value is represented in FIG. 2 as a dot-dash tangent to the time variation of the release travel path $x_K(t)$. Since the release path point $x_T$ determined in this way is again above the actual end point $x_{LE}$, analogous to the first method variant the end point $x_{LE}$ is determined by subtracting a correction value $\Delta x_{Korr}'$ in accordance with the equation $x_{LE} = x_T - \Delta x_{Korr}'$.

Figure 3:
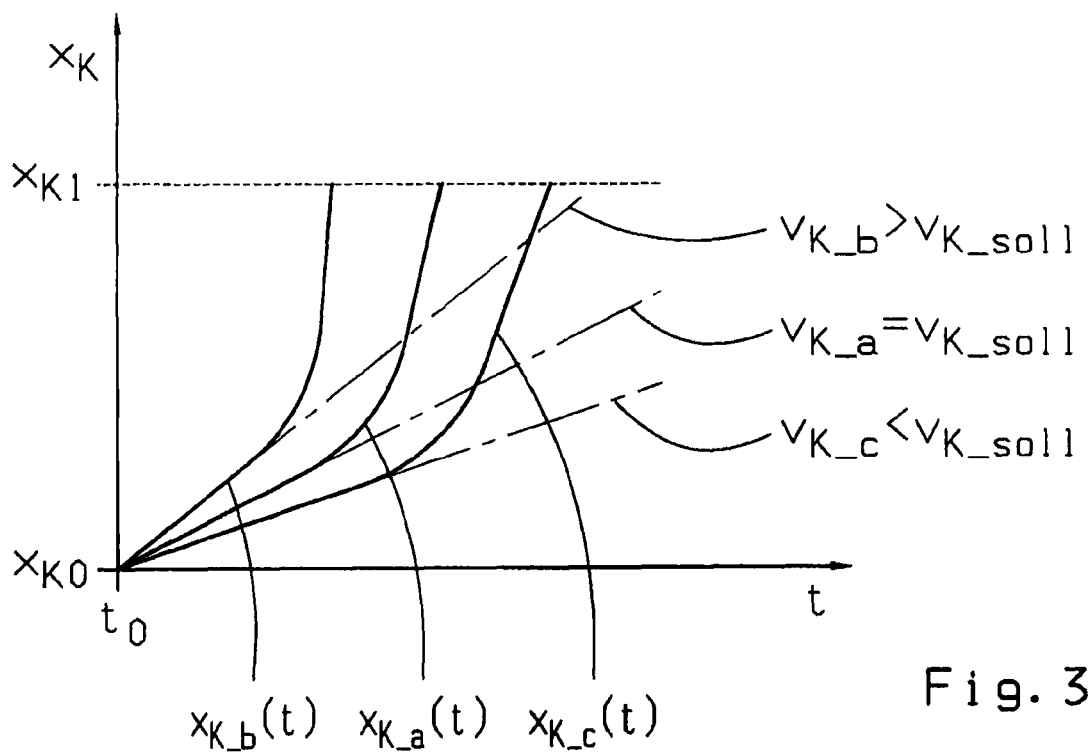
FIG. 3: Diagram illustrating a third method for determining a further characteristic of a diaphragm spring clutch from the time variation of the release travel path

A further variant, illustrated in FIG. 3, presupposes that the friction clutch is disengaged with constant control or actuation of the clutch control element which, in the linear increase range at the beginning of the release travel path $k_K(t)$, corresponds to a nominal disengagement rate $v_{K\_soll}$ used in normal operation ($v_K \approx v_{K\_soll}$). From the time variation of the release travel path $x_K(t)$ the disengagement rate $v_{K\_ist} = \Delta x_K / \Delta t$ of the linear increase range at the beginning of the release travel path $x_K(t)$ is determined, and from this the rate difference $\Delta v_K$ relative to the nominal disengagement rate $\Delta v_{K\_soll}$ is formed ($\Delta v_K = v_{K\_soll} - v_{K\_ist}$). Finally, the clutch control element's control parameter concerned is corrected proportionally to the rate difference $\Delta v_K$ in order to arrive at the nominal disengagement rate $v_{K\_soll}$.

Thus, by such correction of the control parameter, production- and wear-related deviations of the variation of the releasing force $F_{KA}(x_K)$ over the regulation path, which result in a deviation of the disengagement rate $v_{K\_ist}$ from the nominal disengagement rate $v_{K\_soll}$ in the time variation of the release travel path $x_K(t)$, can be compensated. Furthermore, the control parameter so determined can be used during regulation as a basic reinforcement factor of the clutch regulator. To explain the method variants further, FIG. 3 shows three disengagement processes with different disengagement rates $v_K = \Delta x_K / \Delta t$ in the linear increase range at the beginning of the release travel path $x_K(t)$. In the middle disengagement process, denoted $x_{K\_a}(t)$, the disengagement rate $v_{K\_a}$ indicated by a dot-dash tangent corresponds to the nominal rate $v_{K\_soll}$ in accordance with the equation $v_{K\_a} = v_{K\_soll}$, so that correction of the clutch control element's control parameter concerned is necessary.

In contrast, the upper disengagement process denoted as $x_{K\_b}(t)$, whose disengagement rate is indicated by the dot-dash tangent $v_{K\_b}$, is more rapid than the nominal rate $v_{K\_soll}$, i.e. $v_{K\_b} > v_{K\_soll}$, so that to reach the nominal rate $v_{K\_soll}$ the relevant control parameter of the clutch control element must be reduced.

On the other hand, the lower disengagement process denoted as $x_{K\_c}(t)$, whose disengagement rate is indicated by the dot-dash tangent $x_{K\_c}$, is slower than the nominal disengagement rate $v_{K\_soll}$, i.e. $v_{K\_c} < v_{K\_soll}$, so that to reach the nominal rate $v_{K\_soll}$ the relevant control parameter of the clutch control element has to be increased. Thus, the control parameter is expediently corrected proportionally to a rate difference $v_K$ formed from the nominal disengagement rate $\Delta v_{K\_soll}$ and the actual disengagement rate $v_{K\_ist}(\Delta v_K = v_{K\_soll} - v_{K\_ist})'$.

Figure 4:
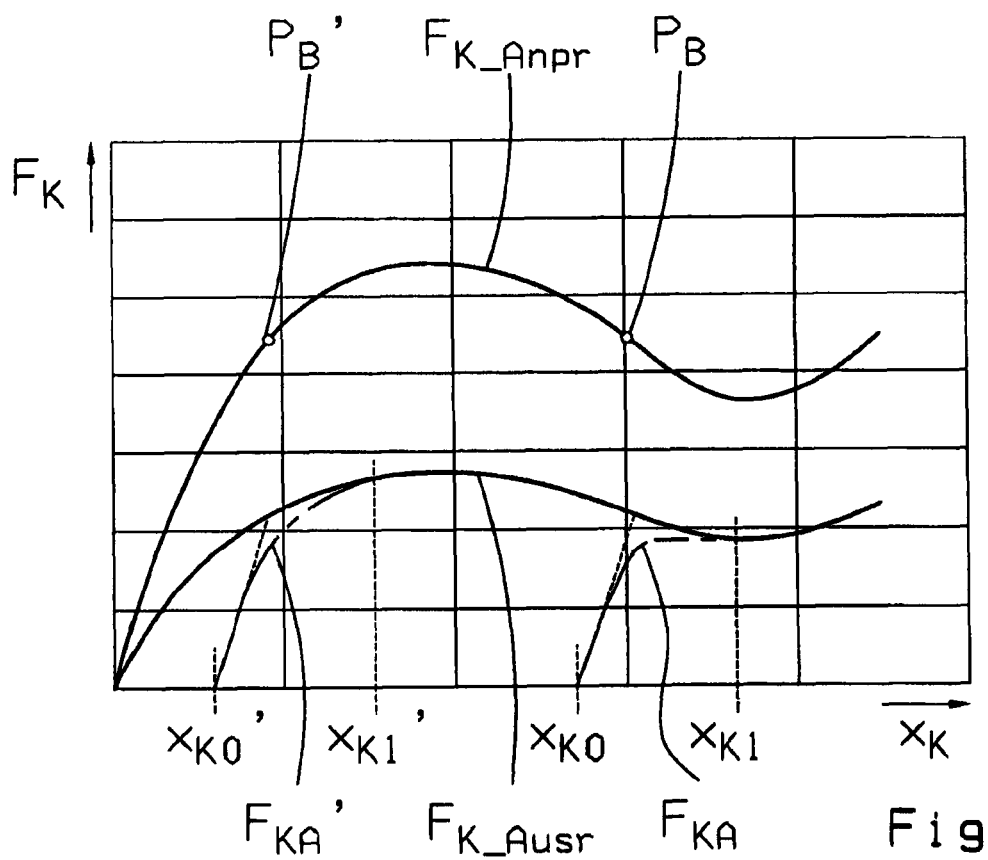
FIG. 4: General representation of the variations of the contact pressure force and the releasing force of a diaphragm spring clutch as functions of the release travel path.

For explanations of FIGS. 4 and 5 references should be made to the corresponding parts of the description text in the introduction.

LIST OF INDEXES

A Increase range, range of $x_K$
B Transition range, range of $x_K$
C Saturation range, range of $x_K$
D Further range, range of $x_K$
$F_K$ Clutch force
$F_{K\_Anpr}$ Contact pressure force
$F_{K\_Ausr}$ Releasing force
$F_{KA}$ Releasing force
$F_{KA\_max}$ Maximum releasing force
$P_B$ Operating point
$P_B'$ Operating point
$v_K$ Disengagement rate
$v_{K\_a}$ Disengagement rate
$v_{K\_b}$ Disengagement rate
$v_{K\_c}$ Disengagement rate
$v_{K\_ist}$ Actual disengagement rate
$v_{K\_min}$ Minimum disengagement rate
$v_{K\_soll}$ Nominal disengagement rate
$x_K$ Regulation path, release travel path
$x_{K\_a}$ Release travel path
$x_{K\_b}$ Release travel path
$x_{K\_c}$ Release travel path
$x_{K0}$ Release travel path point, "in" point
$x_{K1}$ Release travel path, "out" point
$x_{LE}$ End point
$x_{LE\_alt}$ Previously valid end-point value
$x_{LE\_neu}$ Newly determined end-point value
$x_S$ Release travel path point
$x_T$ Release travel path point
t Time
$t_0$ Time point
$t_1$ Time point
$\Delta t$ Time difference
$\Delta v_K$ Rate difference
$\Delta x_K$ Releasing force difference
$\Delta x_{Korr}$ Correction value
$\Delta x_{Korr}'$ Correction value
$\Delta x_{LE}$ End-point difference

The invention claimed is:

1. A method of controlling an automated friction clutch utilized as a starting and gearshift clutch in a drivetrain of a motor vehicle with the friction clutch being located between a drive motor and a change-speed transmission such that, during a clutch actuation, at least one operating parameter of the friction clutch is monitored by sensor means and, from variation of the at least one operating parameter, at least one adaptation parameter is derived for correcting a control parameter of an associated clutch control element, the method comprising the steps of:

fully disengaging the friction clutch by constant control of the clutch control element;

determining a release travel path ($x_K$) as a function of a release time (t), during disengagement of the friction clutch;

determining at least one characteristic value from a time variation of the release travel path ($x_K(t)$);

determining at least one adaptation parameter from the at least one characteristic value for correcting a control parameter of the clutch control element;

determining, as a characteristic value from the variation of the release travel path ($x_K(t)$), a release path point ($x_S$, $x_T$) which is characteristic of a non-linear transition from a linear increase range, at a beginning of the release travel path ($x_K(t)$), to a substantially linear increase range, at an end of the release travel path ($x_K(t)$);

deriving, from the release path point ($x_S$, $x_T$), an end point ($x_{LE\_neu}$) of the linear increase range at the beginning of the release travel path ($x_K(t)$) or an end-point difference ($\Delta x_{LE} = x_{LE\_alt} - x_{LE\_neu}$) of the end point ($x_{LE\_neu}$) from a previously valid end point ($x_{LE\_alt}$); and correcting the previously valid end point ($x_{LE\_alt}$) using a new end point ($x_{LE\_neu}$) or the end-point difference ($\Delta x_{LE}$).

2. The method according to claim 1, further comprising the step of determining the release path point ($x_s$) as an intersection between a tangent to the linear increase range, at the beginning of the release travel path ($x_K(t)$), and a tangent to the substantially linear increase range, at the end of the release travel path ($x_K(t)$).

3. The method according to claim 1, further comprising the step of the determining the release path point ($x_T$) as the value of the release travel path ($x_K(t)$) at which a disengagement rate ($v_K = dx_K/dt$) either reaches or exceeds a specified rate limit value ($v_{K\_Gr}$).

4. The method according to claim 1, further comprising the step of disengaging the friction clutch with either constant control or constant actuation of the clutch control element that corresponds to a minimum disengagement rate ($v_{K\_min}$) which is lower than a nominal disengagement rate ($v_{K\_soll}$), used in the linear increase range, at the beginning of the release travel path ($x_K(t)$) during normal operation ($v_K \approx v_{K\_min} < v_{K\_soll}$).

5. The method according to claim 1, further comprising the step of disengaging the friction clutch with either constant control or constant actuation of the clutch control element that corresponds to a nominal disengagement rate ($v_{K\_soll}$) used in the linear increase range, at the beginning of the release travel path ($x_K(t)$), during normal operation ($v_K \approx v_{K\_soll}$).

6. The method according to claim 5, further comprising the step of determining the disengagement rate ($v_{K\_ist} = \Delta x_K/\Delta t$) of the linear increase range, at the beginning of the release travel path ($x_K(t)$), from the time variation of the release travel path ($x_K(t)$), and from this a rate difference ($\Delta v_K$), relative to the nominal disengagement rate ($v_{K\_soll}$), is formed ($\Delta v_K = v_{K\_soll} - v_{K\_ist}$), and correcting a relevant control parameter of the clutch control element proportionally to the rate difference ($\Delta v_K$) to arrive at the nominal disengagement rate ($v_{K\_soll}$).

7. The method according to claim 1, further comprising the step of, upon completion of final assembly of the motor vehicle, utilizing a manufacturer of the motor vehicle to correct, for a first time, a control parameter of the clutch control element.

8. The method according to claim 1, further comprising the step of executing correction of a control parameter of the clutch control element each time the motor vehicle is re-started.

9. The method according to claim 1, further comprising the step of executing correction of a control parameter of the clutch control element during a driving operation at regular time intervals, in each case during a driving pause connected with at least one of a driving-operation-independent clutch actuation and during driving, in connection with clutch actuation necessitated by either starting or changing a gear.

* * * * *